United States Patent
Rozendaal et al.

(10) Patent No.: US 9,877,068 B2
(45) Date of Patent: Jan. 23, 2018

(54) TRANSMITTER, RECEIVER, SYSTEM AND SIGNAL FOR TRANSMITTING AUXILIARY DATA FRAME SYNCHRONOUSLY ACROSS AN HDMI INTERFACE

(71) Applicant: KONINKLIJKE PHILIPS N.V., Eindhoven (NL)

(72) Inventors: Leendert Teunis Rozendaal, Valkenswaard (NL); Nicoll Burleigh Shepherd, Coulsdon (GB)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 15/124,162

(22) PCT Filed: Mar. 11, 2015

(86) PCT No.: PCT/EP2015/055014
§ 371 (c)(1),
(2) Date: Sep. 7, 2016

(87) PCT Pub. No.: WO2015/144432
PCT Pub. Date: Oct. 1, 2015

(65) Prior Publication Data
US 2017/0019705 A1    Jan. 19, 2017

(30) Foreign Application Priority Data

Mar. 26, 2014 (EP) ..................... 14161817
Jun. 30, 2014 (EP) ..................... 14174997

(51) Int. Cl.
*H04N 5/765* (2006.01)
*H04N 9/80* (2006.01)
(Continued)

(52) U.S. Cl.
CPC ....... *H04N 21/43635* (2013.01); *G09G 5/006* (2013.01); *G09G 5/36* (2013.01);
(Continued)

(58) Field of Classification Search
CPC ....... H04N 21/43635; H04N 21/23614; H04N 21/2353; H04N 5/765
(Continued)

(56) References Cited

U.S. PATENT DOCUMENTS 8,355,078 B2 *   1/2013   Min .................. G09G 5/006
                                                           348/461
8,819,723 B1 *   8/2014   Weir .................. H04N 21/262
                                                           348/473

(Continued)

FOREIGN PATENT DOCUMENTS

EP    1231795 A2    8/2002
JP    2011146929 A   7/2011
WO    2009077969 A2  6/2009

*Primary Examiner* — Robert Chevalier

(57) ABSTRACT

An HDMI transmitter inserts an additional video line in the video frame to be transmitted via the HDMI interface and inserts auxiliary data related to the video frame in the additional video line. The auxiliary data is related to the video frame and as the auxiliary data is stored in the video frame itself it is transported in a synchronous fashion with the video frame. As the additional video line is in excess to the number of video lines defined by a standard video frame format they are ignored by existing receivers yet available to receivers according to the invention and can be transmitted using the existing HDMI standard.

11 Claims, 3 Drawing Sheets

(51) Int. Cl.
*H04N 21/4363* (2011.01)
*G09G 5/00* (2006.01)
*G09G 5/36* (2006.01)
*H04N 21/235* (2011.01)
*H04N 21/236* (2011.01)
*G09G 5/18* (2006.01)

(52) U.S. Cl.
CPC ......... *H04N 5/765* (2013.01); *H04N 21/2353* (2013.01); *H04N 21/23614* (2013.01); *G09G 5/18* (2013.01); *G09G 2370/04* (2013.01); *G09G 2370/12* (2013.01)

(58) Field of Classification Search
USPC ................ 386/231, 239, 240, 245, 248, 337
See application file for complete search history.

(56) References Cited

U.S. PATENT DOCUMENTS

| | | |
|---|---|---|
| 2006/0053471 A1 | 3/2006 | Walker et al. |
| 2010/0157169 A1 | 6/2010 | Yoshida et al. |

* cited by examiner

TRANSMITTER, RECEIVER, SYSTEM AND SIGNAL FOR TRANSMITTING AUXILIARY DATA FRAME SYNCHRONOUSLY ACROSS AN HDMI INTERFACE

CROSS-REFERENCE TO PRIOR APPLICATIONS

This application is the U.S. National Phase application under 35 U.S.C. § 371 of International Application No. PCT/EP2015/055014, filed on Mar. 11, 2015, which claims the benefit of European Patent Application No. 14161817.3, filed on Mar. 26, 2014 and European Patent Application No 14174997.8, filed on Jun. 30, 2014. These applications are hereby incorporated by reference herein.

TECHNICAL FIELD OF THE INVENTION

The invention relates to a transmitter arranged for transmitting a data stream, a receiver for receiving the data stream and a system comprising such a transmitter and receiver, where the data stream comprises a video pixel stream and an auxiliary data channel, the video pixel stream comprising a video frames complying with a video frame format, the video frame comprising active video lines, the video lines comprising video pixels where the transmitter is arranged to transmit auxiliary data related to the video pixel stream via the auxiliary data channel.

BACKGROUND ART

Such a tranmitter is known from the High-Definition Multimedia Interface (HDMI) standard that provides several methods for carrying auxiliary data in auxiliary data channels in addition to the video pixel stream, either multiplexed in the TMDS stream (such as for audio, and signalling (InfoFrames)) or, on separate wires (such as using CEC). HDMI implements the EIA/CEA-861 standards, which define video formats and waveforms, transport of compressed, uncompressed, and LPCM audio, auxiliary data, and implementations of the VESA EDID.[2][3] CEA-861 signals carried by HDMI are electrically compatible with the CEA-861 signals used by the digital visual interface (DVI)

The HDMI standard has the disadvantage that all of the auxiliary channels are asynchronous to the video and in practical implementations the HDMI receiving circuits are connected to their target subsystems using a different connection bus to that of the video. Hence they cannot be used to deliver auxiliary data in a manner which is synchronous with the video.

However, there are some applications that require auxiliary data to be e.g. frame-accurate with the video stream and which cannot be carried in time by the existing asynchronous mechanisms described in HDMI 2.0 and earlier, especially using the current architecture of HDMI transmitter and receiver components. Examples of such applications are frame-accurate disparity and occlusion information for so-called 3D video; or additional high dynamic range or colour gamut information. These applications require an amount of data that is significantly smaller than the video contained within the video frame but which must be provided and processed at the same time as the video data for that frame.

HDMI from version 1.3 onwards allows for a colour depth of up to 16 bits per colour per pixel (bcp). Standard video content usually uses 8 bcp and so-called "Deep Colour" applications use 10, 12 or 16 bcp. It is therefore possible to use some of the bits targeted for the extended colour depth to carry some extra data rather than video data (see <EP2235956>). This is capable of carrying pixel-accurate information at much higher data rates than is required by the above-mentioned applications, so this would be wasteful of resources in the devices, and on the HDMI cable. Moreover, current practical implementations are not capable of handling the necessary high colour depths that would be needed.

EP1231795A2 discloses usig an abbreviated blanking period, in comparison to the standard VESA and CEA-EIA blanking periods, in order to send data, including low bandwidth, non-timing information, over one or more channels of the digital video link. By shortening the blanking period, the amount of time available for sending data in each scan line is increased, enabling the system to send more data over each channel. The inactive video portion of a scan line sent during vertical sync may also be used to send additional digital data. Shortening the blanking periods and/or using the inactive video sections of the horizontal scan lines adds to the overall data capacity of the link and may be used to send other digital data, such as multi-channel audio, video, control, timing, closed captioning or other digital data.

US2010/157169A1 makes it possible to control a CEC-non-compliant device connected to a television receiver by using a remote control sender of the television receiver. [Solving Means] The fact that a physical address [2000] is a device (Recording Device) that a photo player 370B controls in place of the physical address [2000] is set by a user in the photo player 370B. In accordance with this setting, the photo player 370B decides a logical address {1} as a CEC-controlled Recording Device. When the user operates a disc recorder 21 OB that is a CEC-non-compliant device by using a remote control sender 277, a television receiver 250B generates a CEC control command addressed to the disc recorder 210B. The photo player 370B detects the CEC control command, converts the CEC control command into an infrared remote control command, and sends the infrared remote control command from an infrared sending unit 384 to the disc recorder 210B.

In JP2011146929A one frame of video of each system is inserted to the multiplexed video frame being a video frame with a larger screen size, and transmitted as the data of the multiplexed video frame. Audio data of each system is divided by each sample inputted within a time corresponding to one frame period of the multiplexed video frame and inserted to the multiplexed video frame. In each multiplexing circuit, the information concerning the arrangement position in the multiplexed video frame in data of each system and the information concerning the format of data of each system are inserted to the multiplexed video frame. The method is applied to a video acoustic apparatus for processing audio data of a plurality of systems.

It is an objective of this invention to transmit the auxiliary information synchronously with the video data using the existing using the current architecture of HDMI transmitter and receiver components.

DISCLOSURE OF THE INVENTION

To achieve this objective the transmitter comprises an inserter for inserting an additional video line in the video frame in excess of the active video lines required for a video frame complying with the video frame format and in that auxiliary data related to the video frame is inserted in the additional video line of the video frame the auxiliary data is related to or in an additional video line of a video frame preceding the video frame the auxiliary data is related to.

By adding a video line beyond the number of video lines defined in the video frame format room is created for the auxiliary data to be stored. As the auxiliary data is stored in the video frame itself it is transported in a synchronous fashion with the video frame to which it relates thus achieving a synchronous transmission of the auxiliary data. As the additional video line is in addition to the number of video lines defined for a normal video frame by the video frame format it can and will be safely ignored by the existing receivers. Consequently the auxiliary data can be transmitted to existing receivers without causing backward compatibility problems with said existing receivers. By including the auxiliary data in the video frame itself or the video frame preceeding the video frame the auxiliary data relates to it is ensured that the auxiliary data is available when the video frame the auxiliary data relates to is being processed.

HDMI is used as a transport channel for video in various video formats using frames. Such a frame in for example the HD video frame format has 1920 pixels by 1080 active lines, which are repeated at frame rates such as 30 or 60 Hz. The complete descriptions of these formats are provided in Detailed Timing Descriptors (DTDs) or by using pre-defined Short Video Descriptors (SVDs), both of which are defined in CEA-861. HDMI 1.4 also defines some additional pre-defined formats. By extending the video frame with Additional Video Lines (AVLs), in addition to the active video lines (eg the 1080 in the example), the HDMI interface can carry the auxiliary data required by the applications described above. The advantage of this method is that data carried in these Additional Video Lines is carried to or from the video processing circuits by the same internal components and busses as part of the video stream and so the auxiliary data can be processed at the same time as the data in the associated video frame, and the device that provides or uses the video data (e.g. in a memory buffer) can also provide or use the auxiliary data in the same memory buffer.

In an embodiment of the transmitter comprises an inserter arranged to insert a video frame format descriptor which defines at least one additional video line in excess of the active video lines required for a video frame complying with the video frame format. By defining more video lines using a descriptor transmitters can indicate to the receiver that the video frame contains extra video lines and thus contains auxiliary information in those additional video lines. Receivers not able to handle the descriptors will use the regular number of video lines to retreive the video information from and will ignore the additional video lines and descriptor.

The DTD for a particular video format (or eg a pre-defined SVD), instead of specifying the actual number of active lines per video frame, such as 1080 in the example of HD, specifies a larger number of lines. The DTD (or SVD) could for instance define the number of lines as eg 1082, i.e. 2 video lines in exces to the standard number of video lines of 1080. Existing receivers will ignore the video lines in exces to the standard number of video lines as they are hardwired for extracting for instance the standard 1080 active video lines in HD. Using the invention a raw datarate for the auxiliary data can be achieved which varies by video format and frame rate. As an example, the 1920×1080p60 format (at 8 bcp) can achieve a raw data rate of 5.5296 Mb/s, assuming that there are two Additional Video Lines (AVL) in the frame, so depending on how many additional video lines are defined by the descriptor the bandwidth available for the auxiliary data can be adjusted to the needs. In an alternative embodiment, the DTD (or SVD) would not be changed—but other signalling between transmitter and receiver (e.g. one or more of E-EDID, InfoFrame, CEC, and/or other methods) would be used to indicate that auxiliary frame-synchronous data is being transmitted, and where this data is located.

In an embodiment of the transmitter the auxiliary data relates to only a subsection of the video frame.

A receiver according to the invention comprises an extractor for extracting auxiliary data from an additional video line in the video frame and in that auxiliary data related to the video frame is extracted from the additional video line of the video frame the auxiliary data is related to or from an additional video line of a video frame preceding the video frame the auxiliary data is related to.

By adding a video line in excess to the number of video lines defined in the video frame format room is created for the auxiliary data to be stored. As the auxiliary data is stored in the video frame itself it is transported in a synchronous fashion with the video frame to which it relates. As the additional video line is in addition to the number of video lines defined for a normal video frame by the video frame format it can and will be safely ignored by the existing receivers. By including the auxiliary data in the video frame itself or the video frame preceeding the video frame the auxiliary data relates to it is ensured that the auxiliary data is available when the video frame the auxiliary data relates to is being processed. The receiver can establish that additional video lines with auxiliary data in them are present, identify and extract the additional video lines from the video frame, extract the auxiliary information from the additional video lines and use the auxiliary information to process the video frame or subsequent video frame.

In an embodiment the receiver comprises a descriptor extractor which is arranged to extract a video frame format descriptor which defines at least one additional video line in excess of the active video lines required for a video frame complying with the video frame format.

This allows the receiver to easily identify the additional video lines.

A transmission system according to the invention comprises a transmitter according to the invention and a receiver according to the invention. Having both the transmitter and receiver according to the invention in the system allows the auxiliary data to be used across the system, yet existing receivers may also be part of the system as the use of additional video lines to transmit the auxiliary data ensures that the auxiliary data is safely ignored by the existing receivers.

Even though the description refers to the HDMI standard and HDMI channels, it is evident to the person skilled in the art that the invention can be used as well with other transmission channels from the same problem as HDMI.

MODES FOR CARRYING OUT THE INVENTION

Figure 1:
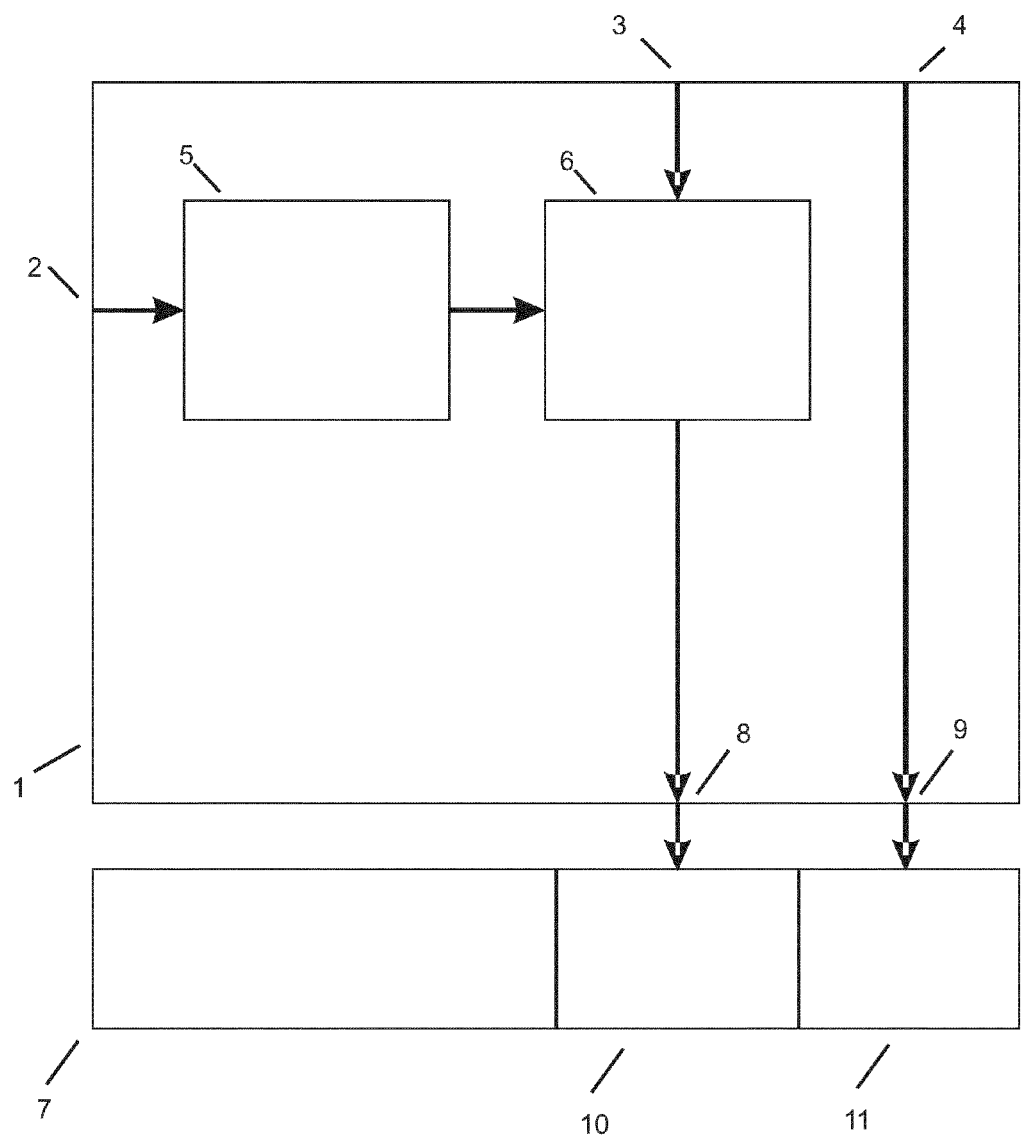
FIG. 1 shows a transmitter according to the invention.

FIG. 1 shows a transmitter according to the invention. The transmitter 1 comprises a video processor 5 which receives video frames to be transmitted from input 2 of the transmitter. The video frames are passed on to the inserter 6 which is arranged to insert Additional Video Line(s) AVL into the video frame. The inserter 6 receives auxiliary data to be inserted into the Additional Video Line(s) AVL from an auxiliary data input 3. By inserting the auxiliary data in the Additional Video line(s) it is ensured that the auxiliary data travels together with the video frame to which the auxiliary data relates through the system by sending the extended video frame comprising both the active video lines and the Additional Video Lines via video output 8 to the video channel 10 in the HDMI channel 7. This ensures that the auxiliary data is transmitted synchronously with the video data using the existing using the current architecture of HDMI interface. Auxiliary data that does not need to be transmitted synchronously with the video data is received on the asynchronous auxiliary data input 4 and via the asynchronous auxiliary data output 9 transmitted via an asynchrounous channel 11 of the HDMI channel. A combination of the two auxiliary data inputs 3,4 is also possible, resulting in a single input. In this case the transmitter internally splits (not shown) the auxiliary data in auxiliary data to be transmitted as part of the video frame in the Additional Video Lines AVL and asynchronous auxiliary data to be transmitted via an asynchronous channel 11 of the HDMI channel 7.

Figure 2:
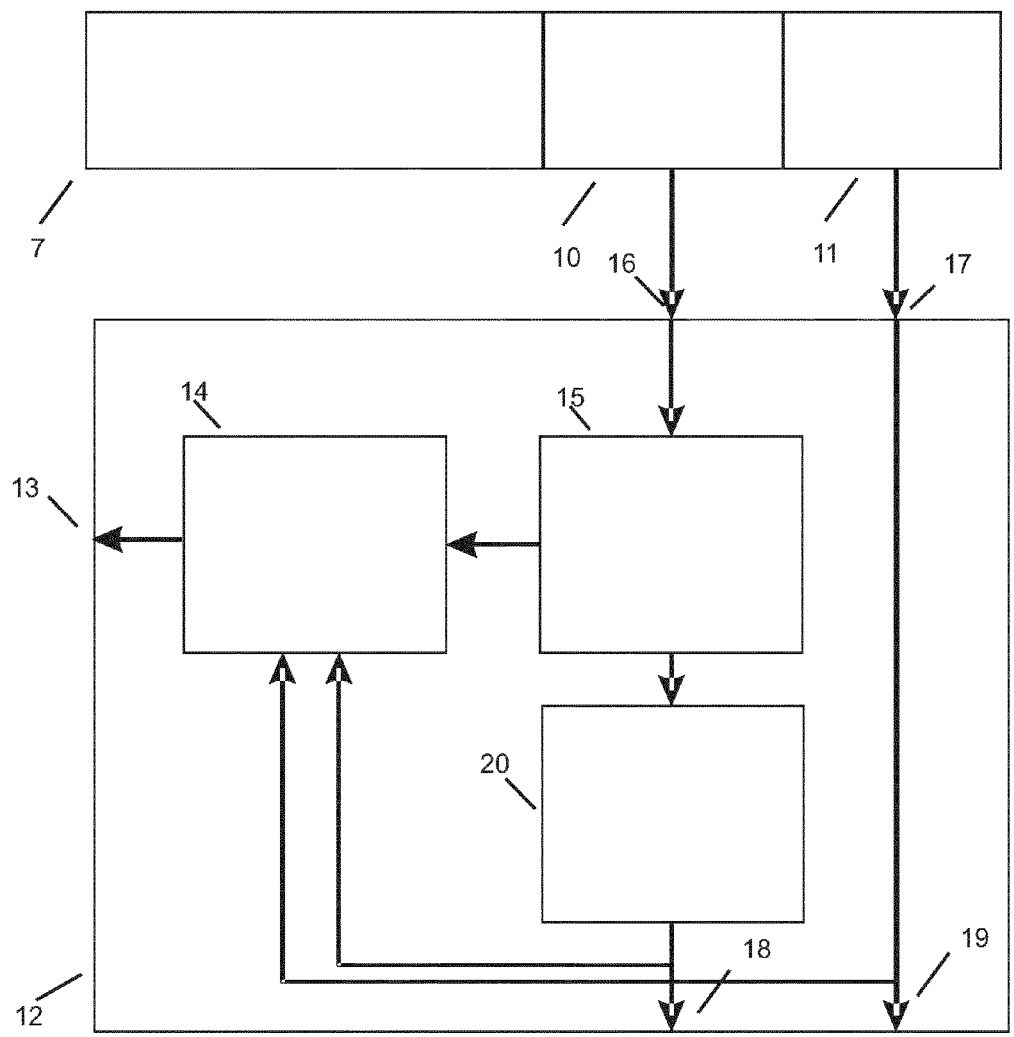
FIG. 2 shows a receiver according to the invention.

FIG. 2 shows a receiver according to the invention. The receiver 12 comprises an buffer 15 which receives video frames from input 16 of the transmitter which in turn receives video frames from the video channel 10 of the HDMI channel 7. The video frames are passed from the input 16 to the extractor 20 which is arranged to extract Additional Video Line(s) AVL from the received video frame. The extractor 20 extracts the auxiliary data from the Additional Video Line(s) AVL and provides the auxiliary data to the first auxiliary data output 18. If the auxiliary data extracted from the Additional Video Lines is also required for processing the associated video frame the extractor 20 also passes the extracted auxiliary data to the video rocessor 14 in the receiver 12. Auxiliary data thus is present in the video buffer at the same time as the associated video frame and can thus in a timely manner be used by the system instead of having to receive the auxiliary data through the asynchronous channel 11 of the HDMI channel 7, risking that the auxiliary data arrives to late for use. This ensures that the auxiliary data is transmitted synchronously with the video data using the existing using the current architecture of HDMI interface. In the embodiment shown the extractor 20 and video processor 14 act on the buffer memory 15 separately while maintaining the relation between video data and auxiliary data. Alternatively the extractor can retreive the entire video frame, i.e. active video lines and Additional Video Lines from the video buffer 15, extract the Additional Video Lines, extract the Auxiliary data from the Additional Video Lines and provide both the active video lines and extracted auxiliary data to the video processor 14.

The video processor 14, in both cases uses the active video lines and the auxiliary data to create receiver output data which is presented on receiver output 13.

Auxiliary data that is not needed immediately is being transmitted via asynchronous channel 11 of the HDMI channel 7. This auxiliary data can be sent to a separate auxiliary data output 19 directly if it is of no interest to the video processor 14, or it can be provided to the video processor as well.

Figure 3:
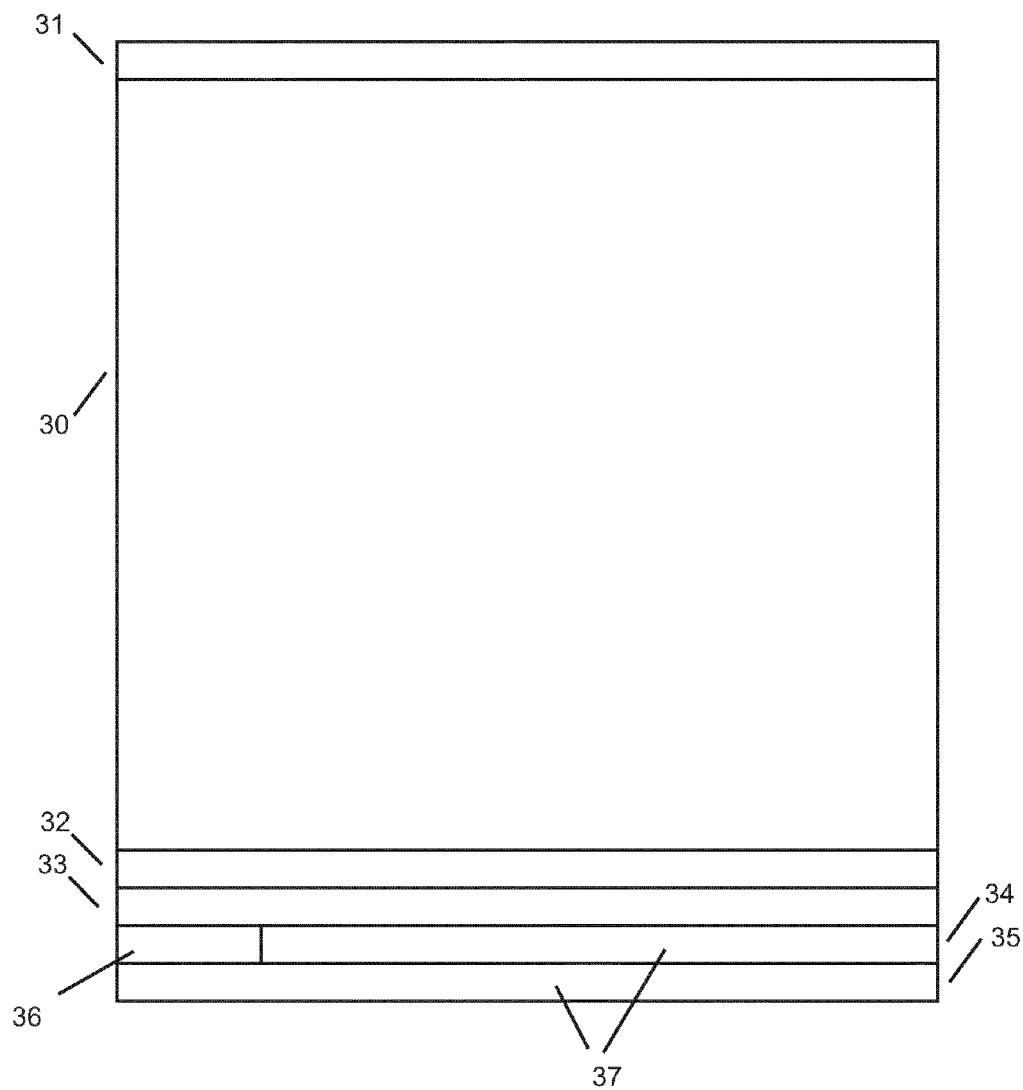
FIG. 3 shows a video frame with additional video lines holding auxiliary data.

The video processing circuits in the receiving HDMI device can also be made aware that the video frame contains AVLs, using e.g. the asynchronous InfoFrame signalling system via the asynchronous channel 11 of the HDMI channel 7. The video processing circuits can then extract the data contained in the additional video line(s) AVL for each video frame and process that data with the video data for that video frame. FIG. 3 shows a video frame with Additional Video Lines AVL holding auxiliary data.

Existing HDMI transmitter and/or receiver implementations transmitting/receiving HD video data use a video frame with 1080 active video lines each holding 1920 video pixels. In FIG. 3 the video frame 30 is shown to hold 1080 active video lines 31, 32, 33, where the first line 31 and last two lines, the $1079^{th}$ video line 32 and the $1080^{th}$ video line 33 are shown. In this example 2 Additional Video Lines 34, 35 are shown. The descriptor for this video fram thus indicates 1082 lines. Other numbers of Additional Video Lines are of course also possible, depending on the bandwidth need of the synchronously transmitted auxiliary data. The transmitter 1 of FIG. 1 fills 1080 lines 31, 32, 33 with video data, and the two Additional Video Lines 34, 35 with auxiliary data 37. A header 36 is also provided in the first Additional Video line 34. The HDMI transmitter will generate 1082 lines and send them via the HDMI channel 7 as a single video frame. Similarly, on the receiving end, the receiver 12 of FIG. 2 will receive 1082 video lines and deliver them into a video buffer. The receiving video processor will read 1080 lines of video data from the buffer and the extractor will extract the auxiliary data from the 2 Additional Video Lines of the video buffer.

The AVL data is carried in one or more of the three TMDS channels of the HDI channel. If multiple channels are used, the AVL Header might be in one or more of the used TMDS channels. Which of the TMDS channels are used could be part of the signalling data—or chosen by the transmitter and automatically deduced in some way by the receiver.

The header contains information such as a payload type identifier, how many lines are used in this frame, data length for this frame and other information pertaining to the data container. The header may also contain identification as to whether the data contained in these additional video lines is synchronous with the video frames in the video stream, or whether the data is asynchronous. The actual payload data will be defined by the users of the Frame-synchronous Data Channel thus created in the Additional Video Lines and may contain further payload identifiers, checksums and other similar data.

In case multiple sets of AVL data are used, the AVL Header would indicate the location of the various payloads within the Additional Video Lines. An alternative embodiment is that the AVL Header indicates the characteristics of one payload, and its length, along with a reference where/how to find the next AVL Header which contains the characteristics of another payload and its length, and a reference (if any) where/how to find yet another AVL Header.

Although this patent shows these AVLs are added at the end of the active video frame, in another embodiment it is also possible to put them at the beginning of the frame, or in both locations, or in one or multiple other areas of the vertical and/or horizontal blanking area.

In addition to the AVLs there can be an indication that a video stream uses AVLs. As previously mentioned, this indication could be carried in one of the InfoFrames sent with the video stream. However, in order to avoid problems with devices that do not implement the Frame-synchronous Data Channel as created by the present invention, the receiver also needs to indicate that it is capable of handling the Frame-synchronous Data Channel. This could be accomplished by including such an indication in the receiver's E-EDID (Enhanced Extended Display Identification Data), as defined by CEA-861 and VESA. The Frame-synchronous Data Channel may also be used for near-synchronous applications where such data is sent in advance of the time when it is needed, i.e. the auxiliary data is included in a video frame preceeding the video frame the auxiliary data relates to. This is advantageous where the video processing takes a significant time, eg several frames. It ensures that the auxiliary data is available for the video processor before the processing of the related video frame starts. Alternatively, the data is sent as described above along with an indication that it should be applied at some future time. For instance, this indication could show that the data should be used in a number of video frames after the current frame, or that it should be applied to the current or the next video frame.

Not all applications require the data to be sent for each video frame. For instance, the data can be applied to a set of video frames, which might, for example, correspond to a single scene in a movie. In this situation, data may be sent in the current video frame, or in advance, with a further indication that this data should be applied continuously from the time indicated (ie current frame or future frame) until some further indication. In this way, the data will be applied to the video processing until the next auxiliary data is sent and takes effect. An indication can be given that the auxiliary data applies for a specified number of video frames from when it first takes effect.

It is also possible for the data to be sent in advance with an identification of each set of data, so that a multiplicity of such sets of data can be sent and identified. The indication of when data should take effect also includes which set of pre-loaded and identified data must then be applied from that time.

Also, regions of the screen can be defined (eg using pixel position and line number) where different sets of data should be applied at a specified time. For instance, one set of data could apply to the whole screen video, but a specific region, which might, for instance, contain a menu or other on-screen display, could use a different set of data. In HDMI, the video data has some data protection mechanism (8-to-10 and 10-to-8 transformation), which might not be sufficient protection for the data carried in the AVL. To provide better protection against e.g. bit errors during transmission, additional measures can be taken, e.g. adding a checksum to the transmitted data and/or providing additional error detection and correction facilities. One particular example would be to use a mapping of 8 data bits to 24 bits (3 bytes), which are carried for a particular video pixel. In the receiver, the 24 bits are mapped to 8 data bits. Such mapping would also take care of avoiding pixel values which have a specific meaning (or are forbidden, such as 0 and 255 when using "limited range"). Other embodiments could use more elaborate error detection/correction methods.

The invention can be applied to all HDMI versions, in particular both versions currently available for developing new products (HDMI 1.4b and HDMI 2.0), though one could imagine the invention would also be applied to existing HDMI products (even when using an older HDMI version) using software update.

The invention claimed is:

1. A transmitter arranged for transmitting a data stream,
the data stream comprising a video pixel stream and an auxiliary data channel,
the video pixel stream comprising a video frames complying with a video frame format,
the video frame comprising active video lines,
the video lines comprising video pixels
wherein the transmitter is arranged to transmit auxiliary data related to the video pixel stream via the auxiliary data channel,
wherein the transmitter comprises an inserter for inserting an Additional Video Line in the video frame in excess of the active video lines required for a video frame complying with the video frame format and in that auxiliary data related to the video frame is inserted in the additional video line of the video frame the auxiliary data is related to or in an Additional Video Line of a video frame preceding the video frame the auxiliary data is related to.

2. The transmitter of claim 1,
wherein in a the transmitter comprises an inserter arranged to insert a video frame format descriptor which defines at least one additional video linein excess of the active video lines required for a video frame complying with the video frame format.

3. The transmitter of claim 1 where the auxiliary data relates to only a subsection of the video frame.

4. A receiver arranged for receiving a data stream,
the data stream comprising a video pixel stream and an auxiliary data channel,
the video pixel stream comprising a video frame complying with a video frame format,
the video frame comprising active video lines,
the video lines comprising video pixels
wherein the receiver is arranged to receive auxiliary data related to the video pixel stream via the auxiliary data channel,
wherein the receiver comprises an extractor for extracting auxiliary data from an additional video line in the video frame that is in excess of the active video lines required for a video frame complying with the video frame format and in that auxiliary data related to the video frame is extracted from the additional video line of the video frame the auxiliary data is related to or from an additional video line of a video frame preceding the video frame the auxiliary data is related to.

5. The receiver of claim 4,
wherein the receiver comprises a descriptor extractor which is arranged to extract a video frame format descriptor which defines at least one additional video line in excess of the active video lines required for a video frame complying with the video frame format.

6. The receiver of claim 4 where the auxiliary data relates to only a subsection of the video frame.

7. The transmission system for transmitting auxiliary data in auxiliary data channels and a video pixel stream comprising video frames comprising video lines comprising video pixels, the system comprising a transmitter as claimed in claim 1.

8. A computer-readable storage-medium that is not a transitory propagating signal or wave, the medium comprising a signal comprising a data stream,
the data stream comprising a video pixel stream and an auxiliary data channel comprising control information to control the display of the video pixel stream,
the video pixel stream comprising a video frames complying with a video frame format,
the video frame comprising video lines,
the video lines comprising video pixels
wherein the auxiliary data in the auxiliary data channel is related to the video pixel stream and
wherein the video frame comprises an additional video line in excess of the active video lines required for a video frame complying with the video frame format and the additional video line comprises auxiliary data related to the video frame or the subsequent video frame.

9. The storage-medium of claim 8, wherein a video frame format descriptor defines at least one additional video line in excess of the active video lines required for a video frame complying with the video frame format.

10. The storage-medium of claim 8 where the auxiliary data relates to only a subsection of the video frame.

11. A transmission system for transmitting auxiliary data in auxiliary data channels and a video pixel stream comprising video frames comprising video lines comprising video pixels, the system comprising a receiver as claimed in claim 4.

* * * * *